United States Patent Office 2,798,071
Patented July 2, 1957

2,798,071
PROCESS FOR THE PRODUCTION OF QUINOLINE ALDEHYDES

Wilhelm Mathes and Walter Sauermilch, Ludwigshafen (Rhine), Germany, assignors to Dr. F. Raschig G. m. b. H., Ludwigshafen (Rhine), Germany No Drawing. Application January 21, 1955,
Serial No. 483,446

Claims priority, application Germany February 1, 1954

7 Claims. (Cl. 260—289)

The present invention relates to an improved process for the production of quinoline aldehydes by the controlled oxidation of methyl quinolines in the vapor phase.

Quinoline aldehydes have previosly been prepared by various methods which, while capable of producing quinoline aldehydes in very limited quantities for laboratory purposes, were unsuitable for the technical production of such aldehydes in commercial quantities. For example, quinoline aldehydes have been produced from methyl quinoline by oxidation in the liquid phase with selenium dioxide (C. A. Buehler and James O. Harries, J. Amer. Chem. Soc. 72, p. 5015, 1950; M. Seyhan, Berichte 85, p. 425, 1952). A further method for the production of quinoline aldehyde started with quinaldine chloral which, after conversion to β-(quinolyl)-2-acrylic acid, was oxidized with potassium permanganate in an alkaline soda solution to produce quinoline-2-aldehyde (v. Müller and Spady, Berichte 18, p. 3404, 1885). Still another method proposed was by decomposing the tolyl sulfonyl derivative of quinoline-3-carboxylic acid hydrazide by short heating to 160° C. with glycol and sodium carbonate (A. H. Cook, I. M. Heilbron and L. Steger, J. Chem. Soc. London, 1943, p. 413). Yet another method was described by L. K. Sharp for the production of quinoline-2-aldehyde from tribromquinaldine (J. Pharm. Pharmacol. 1, p. 395, 1949).

It has now surprisingly been found that methyl quinolines can be oxidized catalytically in the vapor phase with oxygen containing gases to produce good yields of quinoline aldehydes provided the oxidation is carried out under the special conditions indicated in our copending application Serial No. 378,677, filed September 4, 1953, now U. S. Patent 2,749,351, for the production of pyridine aldehydes from methyl pyridines.

In accordance with the invention, it was found necessary to carry out the oxidation in the presence of steam. Also, in order to obtain the desired quinoline aldehydes in good yields, it is expedient to keep the reaction zone free of iron oxide or copper oxide or iron and copper in such form that they are capable of forming such oxides. It was found that the addition of certain quantities of steam to the reaction mixture have an extremely favorable effect upon the quantity of quinoline aldehydes that can be recovered in the partial oxidation of methyl quinolines. On the other hand, the presence of iron oxide or copper oxide substantially accelerates the undesired formation of carbon dioxide and consequently lowers the yields of quinoline aldehydes obtainable.

The above-mentioned requirements, however, in themselves do not suffice to achieve the desired production of quinoline aldehydes. It has also been found necessary to employ regulated quantities of oxygen or air for the oxidation. The use of only very limited quantities of oxygen is of extreme importance when the partial oxidation of methyl quinolines is carried out with only limited quantities of steam present or when low space velocities are to be employed. The three variables: quantity of water added, quantity of air or oxygen and space velocity have such a relationship that improved yields of the desired aldehydes are obtained with increasing quantities of water and increased space velocities as well as with decreasing quantities of oxygen.

The following formula indicates the largest quantity of oxygen permissible with reference to the quantity of water added as well as the space velocity employed:

$$X = (4.06 - 2.02 \cdot \log p) \cdot (S + 1.4)$$

wherein X represents the number of moles of $O_2$ permissible per mol of methyl quinoline employed, $p$ the percent by weight of methyl quinoline in the methyl quinoline-steam mixture (taken as a whole number) and S is the space velocity employed divided by 10,000. (By space velocity, we mean the total volume of gas, measured at 0° C. and 760 mm. Hg, in ccm. per hour divided by the volume of the catalyst in ccm.)

For example, in accordance with such formula when employing a mixture of methyl quinoline and water containing 50% by weight of each, the greatest quantity of oxygen permissible per mol of methyl quinoline is 1.2 at a space velocity of 5,000, 2.2 at a space velocity of 20,000 and 3.4 at a space velocity of 40,000.

The oxidation catalysts employed for the process according to the invention are those suggested in the literature, namely, oxides of metals of subgroup A of the V, VI and VII groups of the periodic system. The catalysts can be applied to carriers such as pumice, silica gel and alumina in order to increase their surface area. As the presence of iron oxide or copper oxide is detrimental to the production of quinoline aldehydes, it is preferable that the catalysts and carriers be freed of such oxides and also that the reactors in which reaction is to take place are free of such oxides as well as iron and copper in such form that oxides are produced under the conditions of the reaction. For example, ordinary iron and steel reactors have been found to have a detrimental effect upon the production of the pyridine aldehydes.

Elevated temperatures between 250° C. and 450° C., preferably between 370° C. and 430° C., are employed for the partial oxidation of methyl quinolines to quinoline aldehydes according to the invention. The temperature selected of course is such that the methyl quinoline is in the vapor phase.

The most preferred conditions for carrying out the process according to the invention are the use of 0.2 to 4 moles of oxygen per mol of methyl quinoline, space velocities between 10,000 and 40,000, and quantities of steam which are 85–99 percent by weight of the steam-methyl quinoline mixture employed.

In addition to the necessary addition of steam to the reaction mixture, inert diluents such as nitrogen or carbon dioxide can be added to the reaction mixture.

It was also found that when 4-methyl quinoline, also known as lepidine, or methyl quinoline mixtures containing 4-methyl quinoline were oxidized according to the process of the invention, a crystalline intermediate product composed of quinoline-4-aldehyde, 4-methyl quinoline and water of crystallization having a melting point of 60–62° C. was produced in the condensed reaction mixture leaving the catalyst chamber. This intermediate can be employed in separating quinoline-4-aldehyde from the reaction mixture. The free quinoline-4-aldehyde can be recovered from this intermediate product by distilling off the water of crystallization under vacuum and then separating the 4-methyl quinoline from the quinoline-4-aldehyde by fractional distillation under vaccum. The free aldehyde can also be recovered from the intermediate product by extracting such product with bisulfite solution, treating the extract with a saturated soda solution to form the free aldehyde and extracting the free aldehyde with chloroform.

It was furthermore found that quinoline-2-aldehyde produced according to the invention can be caused to dimerize to product 2-quinaldoine. This dimerization can be effected by permitting the condensed reaction mixture to stand for some time at temperatures of 50–100° C. or by heating the reaction mixture at this temperature for a short time in the presence of cyanogen ions. The 2-quinaldoine has the following formula:

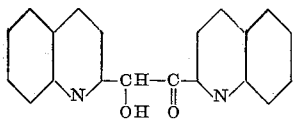

The following examples will serve to illustrate the manner in which the process according to the invention can be carried out.

Example 1

The vapors of 615 cc. of water and 8.5 grams of quinaldine (2 methyl quinoline) in admixture with 25 liters of air were passed at 410° C. per hour over 25 cc. of a catalyst composed of silica gel impregnated with 10% by weight of $MoO_3$ disposed in an aluminum reactor tube. The vapors leaving the reactor tube were condensed and indirectly cooled with ice water. The condensate was shaken out several times with chloroform. The resulting chloroform extract was then extracted with aqueous sodium bisulfite to extract the aldehyde. The bisulfite extract was then treated with a saturated soda solution to produce the free aldehyde and the free aldehyde was extracted with chloroform. Upon distillation of the chloroform from such extract, the quinoline-2-aldehyde remained as a crystalline residue which was then recrystallized from benzine. The yield of quinoline-2-aldehyde per hour was 3 grams and 4.1 grams of quinaldine were recovered per hour. The yield of quinoline-2-aldehyde was 62%.

The quinoline-2-aldehyde in the reaction mixture produced can be dimerized to 2-quinaldoine by heating the condensed reaction mixture for several hours at 80° C. The dimerization can be effected in a substantially shorter period by adding 2 cc. of a 5% aqueous potassium cyanide solution to the reaction mixture being heated.

The 2-quinaldoine after recrystallization from pyridine had a melting point of 232° C.

Example 2

The vapors of 111 cc. of water and 2.05 grams of lepidine in admixture with 6 liters of air per hour were passed at 410° C. through the same catalyst and reactor tube as described in Example 1 for six hours. The vapors leaving the reaction tube were condensed and cooled and a solid crystalline precipitate was obtained in such condensate which after filtering off amounted to 9.95 grams. The precipitate was an intermediate compound composed of 1 mol of quinoline-4-aldehyde, 1 mol of lepidine and about 2 mols of water of crystallization. The melting point of this intermediate product was 60–62° C.

The free quinoline-4-aldehyde was recovered from the solid intermediate product by extracting with sodium bisulfite solution and treating the extract with a soda solution and extracting with chloroform in a manner analogous to Example 1. The aqueous portion of the condensate from which the solid intermediate had been filtered off was also extracted and treated in the same manner as the condensate obtained in Example 1 to recover the free aldehyde contained therein.

The quantity of quinoline-4-aldehyde obtained was 6.1 grams and 4.2 grams of lepidine were recovered. The yield therefore was 68.5%.

The quinoline aldehydes obtainable by the process of the present invention are rather reactive substances and undergo the usual aldehyde reactions such as, for example, those of benzaldehyde. They are, for example, easily reduced to the corresponding carbinols, undergo the Cannizarro reaction and react with substances containing an $NH_2$ group to produce Schiff bases. They can be used as intermediate products in the production of pharmaceuticals.

We claim:
1. A process for producing a quinoline aldehyde which comprises passing a methyl quinoline carrying a methyl group on the pyridine ring of such quinoline in admixture with steam and an oxygen containing gas in vapor phase through a reaction space containing an oxidation catalyst comprising at least one metal oxide selected from the group consisting of oxides of metals of subgroup A of groups V, VI and VII of the periodic system at a temperature between 250° C. and 450° C., the quantity of oxygen in such gas mixture being at most equal to X moles per mol of methyl quinoline where

$$X = (4.06 - 2.02 \cdot \log p) \cdot (S + 1.4)$$

in which $p$ is the percent by weight, expressed as a whole number of methyl quinoline in the admixture of methyl quinoline and steam and $S$ is the space velocity divided by 10,000, and recovering the quinoline aldehyde produced from the reaction mixture leaving the reaction space.

2. A process according to claim 1 in which the gas mixture is passed over the catalyst at a space velocity of between 10,000 and 40,000, the quantity of steam in such gas mixture is 85 to 99% by weight of the steam-methyl quinoline mixture employed and the oxygen content of the gas mixture is 0.2 to 4 mol per mol of methyl quinoline.

3. A process according to claim 1 in which the temperature employed is between 370° C. and 420° C.

4. A process according to claim 1 in which the methyl quinoline is 2 methyl quinoline.

5. A process according to claim 1 in which the methyl quinoline is lepidine.

6. A process according to claim 1 in which the methyl quinoline is lepidine, and the reaction mixture leaving the reaction space is cooled to form an aqueous condensate containing a solid precipitate of an intermediate product composed of quinoline-4-aldehyde, lepidine and water of crystallization, and free quinoline-4-aldehyde is recovered from such solid precipitate.

7. A process for producing a quinoline aldehyde which comprises passing a methyl quinoline carrying a methyl group on the pyridine ring of such quinoline in admixture with steam and an oxygen containing gas in vapor phase through a reaction space containing an oxidation catalyst comprising at least one metal oxide selected from the group consisting of oxides of metals of subgroup A of groups V, VI and VII of the periodic system at a temperature between 250° C. and 450° C., and out of contact with iron oxide and copper oxide, the quantity of oxygen in such gas mixture being at most equal to X moles per mol of methyl quinoline where $$X = (4.06 - 2.02 \cdot \log p) \cdot (S + 1.4)$$

in which $p$ is the percent by weight, expressed as a whole number of methyl quinoline in the admixture of methyl quinoline and steam and $S$ is the space velocity divided by 10,000 and recovering the quinoline aldehyde produced from the reaction mixture leaving the reaction space.

References Cited in the file of this patent
UNITED STATES PATENTS 2,749,351    Mathes et al. _____ June 5, 1956

OTHER REFERENCES

Organic Chemistry, Whitmore, 2nd ed., D. Van Nostrand, Inc., N. Y. (1951), pp. 796 and 797.

Ishigura et al: J. Pharm. Soc., Japan, vol. 72, pp. 865–8 (1952), as abstracted in Chem. Abstr., vol. 47, col. 6416 (1953).